US012705384B2

(12) United States Patent
Lu et al.

(10) Patent No.: US 12,705,384 B2
(45) Date of Patent: Aug. 11, 2026

(54) NODE AND EDGE DEDUPLICATION FOR A PRIVILEGE GRAPH

(71) Applicant: Veza Technologies, Inc., Los Gatos, CA (US)

(72) Inventors: Maohua Lu, Fremont, CA (US); Tarun Thakur, Los Gatos, CA (US)

(73) Assignee: Veza Technologies, Inc., Los Gatos, CA (US)

( * ) Notice: Subject to any disclaimer, the term of this patent is extended or adjusted under 35 U.S.C. 154(b) by 256 days.

(21) Appl. No.: 18/351,292

(22) Filed: Jul. 12, 2023

(65) Prior Publication Data

US 2024/0020407 A1 Jan. 18, 2024

Related U.S. Application Data

(60) Provisional application No. 63/388,879, filed on Jul. 13, 2022.

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2113* (2013.01); *G06F 2221/2141* (2013.01)

(58) Field of Classification Search
USPC .............................................................. 726/1
See application file for complete search history.

(56) References Cited

U.S. PATENT DOCUMENTS 8,196,178 B2 * 6/2012 Lambert ............... G06F 21/604 713/182
2018/0013777 A1 * 1/2018 DiValentin ......... G06Q 10/0635
2018/0211056 A1 * 7/2018 Delisser .............. G06F 21/6218
2020/0296007 A1 * 9/2020 Finn, II ................. H04L 41/145
2021/0226812 A1 * 7/2021 Park .................... H04L 12/2812
2022/0067194 A1 * 3/2022 Thakur ............... G06F 21/6218

FOREIGN PATENT DOCUMENTS

AU 2006302565 B2 * 9/2011 .......... G06F 21/604

* cited by examiner

*Primary Examiner* — Sanchit K Sarker

(57) ABSTRACT

The technology disclosed herein reduces nodes and edges within a privilege graph that indicates access privileges for users to features of data environments. In a particular example, a method provides identifying two attribute nodes of a plurality of nodes in a privilege graph and determining that the two attribute nodes share the same one or more outbound edges. The method further provides combining the two attribute nodes into a combined node. The combined node represents attributes represented by the two attribute nodes. The method also provides tracing the privilege graph from a user through the combined node when determining which of the access privileges correspond to the user.

11 Claims, 10 Drawing Sheets

600C

NODE AND EDGE DEDUPLICATION FOR A PRIVILEGE GRAPH

RELATED APPLICATIONS

This application is related to and claims priority to U.S. Provisional Patent Application 63/388,879, titled "NODE AND EDGE DEDUPLICATION FOR A PRIVILEGE GRAPH," filed Jul. 13, 2022, and which is hereby incorporated by reference in its entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be accessed by which users.

SUMMARY

The technology disclosed herein reduces nodes and edges within a privilege graph that indicates access privileges for users to features of data environments. In a particular example, a method provides identifying two attribute nodes of a plurality of nodes in a privilege graph and determining that the two attribute nodes share the same one or more outbound edges. The method further provides combining the two attribute nodes into a combined node. The combined node represents attributes represented by the two attribute nodes. The method also provides tracing the privilege graph from a user through the combined node when determining which of the access privileges correspond to the user.

In another example, a method provides identifying a first plurality of nodes in a privilege graph that share the same plurality of outbound edges to a plurality of outbound nodes. The method further provides creating an intermediate node and removing the plurality of outbound edges. The method also provides creating first replacement edges from each of the first plurality of nodes to the intermediate node and creating second replacement edges from the intermediate node to each of the plurality of outbound nodes. The method provides tracing the privilege graph from a user through the intermediate node when determining which of the access privileges correspond to the user.

In another example, an apparatus is provided having one or more computer readable storage media and a processing system operatively coupled with the one or more computer readable storage media. Program instructions stored on the one or more computer readable storage media, when read and executed by the processing system, direct the apparatus to perform the steps of the above-recited methods.

DETAILED DESCRIPTION

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be authorized by which users.

Each of the environments discussed above uses its own mechanisms to regulate which users have access to which features and which data. That is, the mechanisms regulate the privileges that each user has for accessing each data environment and prevent users who are not authorized to access certain features or data from doing so. As such, each environment needs to receive information defining the privileges for each user that is authorized to access at least a portion of the features/data available therefrom. To automatically manage user privileges across a multitude of data environments, the graphing service described herein uses a privilege graph to track users and corresponding privileges.

Figure 1:
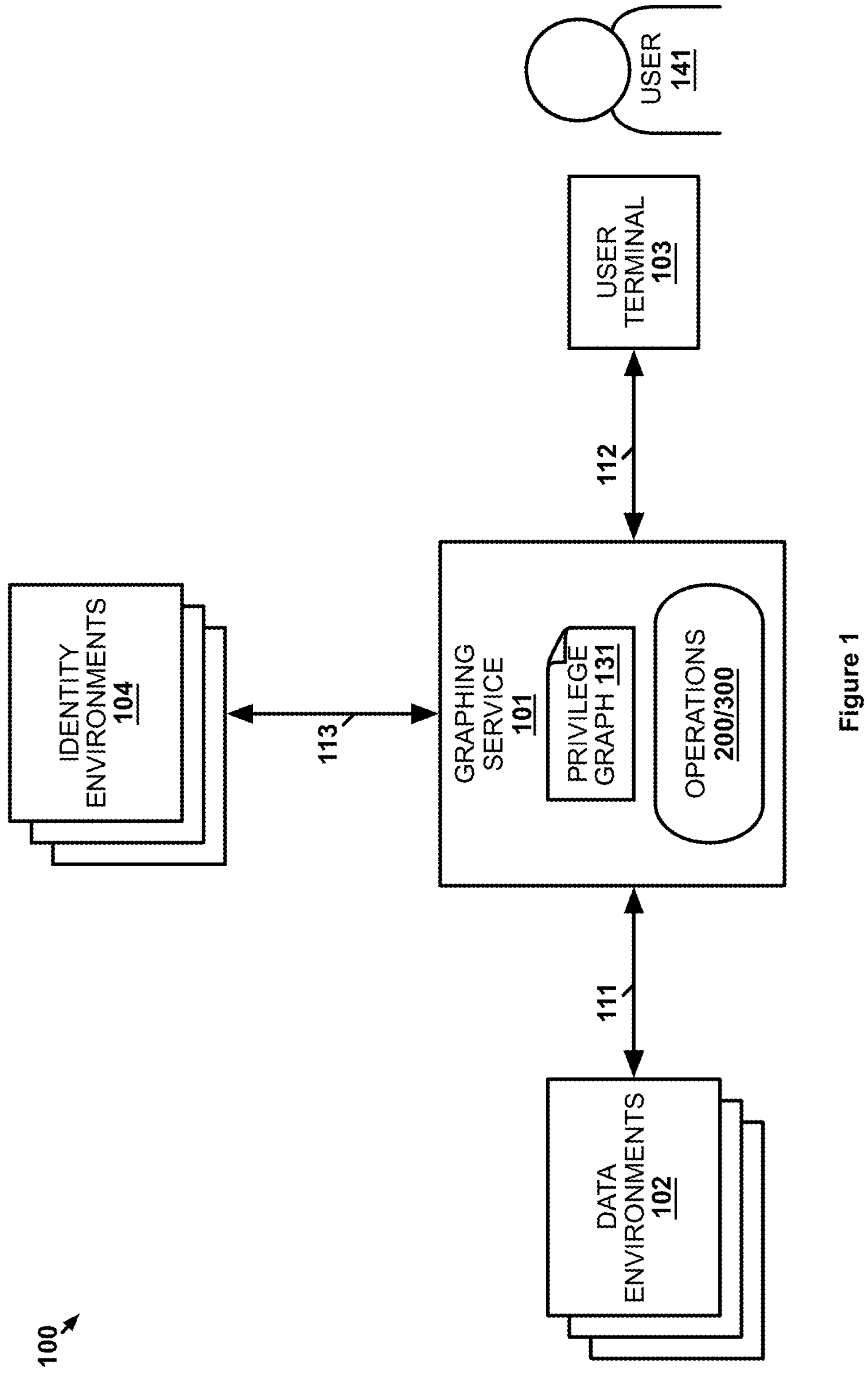
FIG. 1 illustrates an implementation for deduplicating edges and nodes in privilege graph.

FIG. 1 illustrates implementation 100 for deduplicating edges and nodes in privilege graph. Implementation 100 includes graphing service 101, data environments 102, user terminal 103, and identity environments 104. Graphing service 101 and data environments 102 communicate over respective communication links 111. Graphing service 101 and user terminal 103 communicate over communication link 112. Graphing service 101 and identity environments 104 communicate over respective communication links 113. While communication links 111-113 are shown as direct links, communication links 111-113 may include intervening systems, networks, and/or devices. Graphing service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102.

In operation, graphing service 101 generates privilege graph 131, which tracks authorizations defined in identity environments 104 and corresponding ones of data environments 102. Identity environments 104 include one or more systems that maintain information about users (e.g., user identity information, user attributes, etc.) and information about which of data environments 102 (including specific data/features therein) each user is allowed to access. Identity environments 104 may include an active directory (AD) server, a privilege access management (PAM) system, human resources management system (HRMS), identity and access governance (IAG) system, or any other type of system that maintains the user information discussed above. By tracking the authorization of many, if not all, users in an organization (e.g., business enterprise), privilege graph 131 is able to not only represent authorizations for particular users but also represent authorizations based on attributes of users (e.g., the user's role and/or group). For example, when traversing privilege graph 131 using attributes of a user to determine subsequent nodes in the traversal. The subsequent nodes are representative of attributes that the user has, or is associated with, which are indicative of which features of data environments 102 the user can access. Privilege graph 131 may be stored local to graphing service 101 or may be accessible to graphing service 101 from an external data repository, which may itself be managed by one of data environments 102.

Graphing service 101 performs operation 200 and/or operation 300, described below, to reduce the number of nodes and/or edges, respectively, that are included in privilege graph 131. Reducing the number of nodes and edges reduces the potential paths that graphing service 101 must traverse in privilege graph 131 to determine access privileges of various users.

For example, privilege graph 131 may include nodes that have the same outbound edges. Rather than maintaining the two different nodes, graphing service 101 combines the nodes into a single node having the same outbound edges that the previous nodes each had. Any inbound edges to the two nodes are then directed towards the newly combined node.

Figure 2:
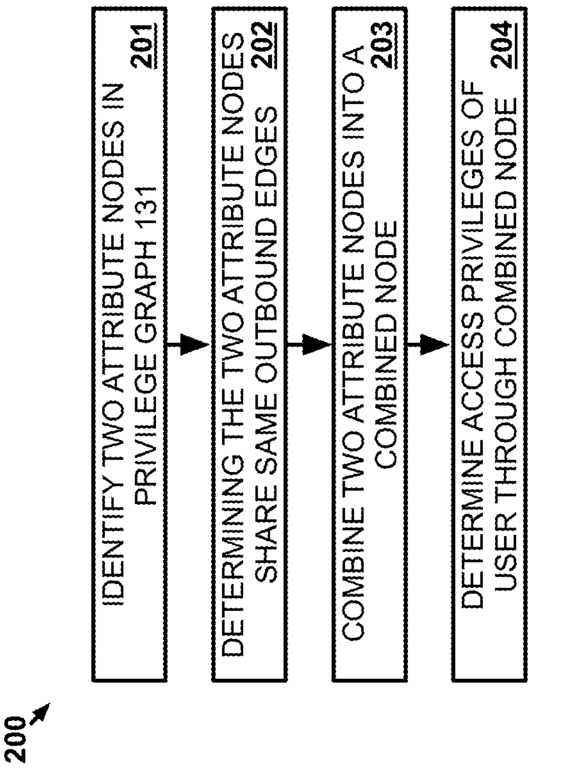
FIG. 2 illustrates an operation for deduplicating nodes in a privilege graph.

FIG. 2 illustrates operation 200 for deduplicating nodes in a privilege graph. In operation 200, graphing service 101 identifies two attribute nodes of a plurality of nodes in privilege graph 131 (201). Attribute nodes are nodes that occur in privilege graph 131 between user nodes, which represent users, and feature nodes, which represent features of data environments 102. Privilege graph 131 can be traced via edges between user nodes through attribute nodes to feature nodes to determine which features a user, or group of users, are able to access. The attributes represented by the attributed nodes may indicate a work group, job title/role, a seniority, a security clearance level, or any other type of attribute that may affect what features of data environments 102 a user can access.

Graphing service 101 determines that the two identified attribute nodes share the same one or more outbound edges (202). For instance, a node representing one user role may have outbound edges to the same features of data environments 102 as another node representing another user role (i.e., all outbound edges overlap as neither node includes an outbound edge that the other does not). None of the inbound edges need be shared between the two attribute nodes. The fact that both attribute nodes share outbound edges indicates that both attributes represented by those nodes result in the same path trace through privilege graph 131. In the above example where the nodes have two different roles as attributes, the two attribute nodes indicate that both roles have access to the same features of data environments 102.

After determining that the two attribute nodes share the same outbound edges, graphing service 101 combines the two nodes into a combined node that represents attributes represented by the two attribute nodes (203). All inbound edges that were directed towards the two attribute nodes are now directed to the combined node. Any inbound edges that were the same between the two attribute nodes (i.e., were inbound from the same node) are deduplicated with respect to the combined node to avoid redundant edges (i.e., two or more edges from one node that are now inbound to the combined node would be reduced to one). Likewise, all outbound edges from the two attribute nodes now extend from the combined node. Since the outbound edges were the same between the two attribute nodes, the outbound edges from the combined node are also the same. Again, continuing the above example, the combined node would represent both roles that were previously represented by the two attributed nodes. If one node had two inbound edges that were distinct from the two inbound edges of the other node, then the combined node will include four total inbound edges. The outbound edges that direct to the features would be the same as were previously shared between the two attribute nodes. That is, if both nodes included outbound edges to the same three features, then the combine node will have outbound edges to the same three features.

When determining access privileges corresponding to a user (or group of users), graphing service 101 traces privilege graph 131 from the user through the combined node (204). As graphing service 101 traces privilege graph 131 for more users, the amount of processing time saved by not having to trace the original two attribute nodes may be substantial. Moreover, in some cases, the two attribute nodes that are combined above may be a subset of the attribute nodes being combined. For instance, the two attribute nodes may be two of five attribute nodes that all share the same outbound edges. Graphing service 101 would therefore combine all five of those attribute nodes into the combined node in the manner described above. The more attribute nodes that can be combined into a single node, the more processing time can be saved by not having to trace those nodes individually. Operation 200 may be performed on privilege graph 131 multiple times to identify and combine additional sets of attribute nodes that include the same outbound edges between them.

Figure 3:
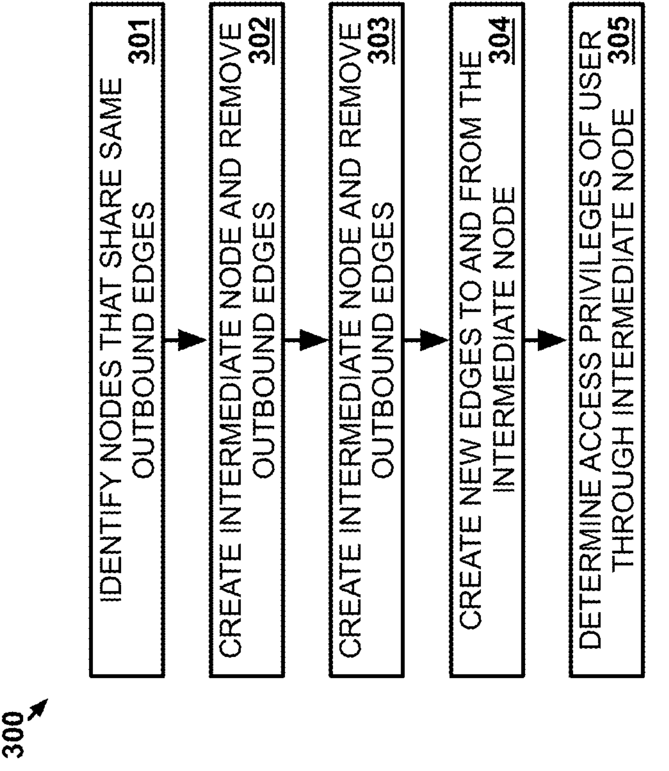
FIG. 3 illustrates an operation for deduplicating edges in a privilege graph.

FIG. 3 illustrates operation 300 for deduplicating edges in a privilege graph. In operation 300, graphing service 101 identifies two or more nodes in privilege graph 131 that all share the same set of outbound edges to outbound nodes (i.e., none of the identified nodes has an outbound edge the others do not) (301). The identified nodes represent an attribute of one or more users. Graphing service 101 creates an intermediate node to be placed in between the identified nodes and the outbound nodes in privilege graph 131 (302).

The intermediate node does not represent an attribute and is merely a pass-through node when traversing privilege graph 131.

Graphing service 101 incorporates the intermediate node into privilege graph 131 by removing the outbound edges between the identified nodes and the outbound nodes (303). The edges are removed because edges of privilege graph 131 will be routed through the intermediate node rather than directly between the identified nodes and the outbound nodes. Graphing service 101 then creates replacement edges to incorporate the intermediate node into privilege graph 131 (304). Specifically, a first set of replacement edges are created from the identified nodes to the intermediate node. Rather than each of the nodes including multiple outbound edges, with one to each respective outbound node, each of the nodes includes only one outbound edge to the intermediate node. Graphing service 101 further creates a second set of replacement edges from the intermediate node to each of the outbound nodes. As such, rather than each outbound node having an incoming edge from each of the identified nodes, each outbound node only receives one edge from the intermediate node.

In an example, five attribute nodes may all include outbound edges to seven feature nodes representing features of data environments 102. That means there are a total of 35 edges between the attribute nodes and the feature nodes. Graphing service 101 performs operation 300 to identify those attribute nodes and create an intermediate node between the attribute nodes and the feature nodes. After performing the above-discussed steps, each attribute node would include a single outbound edge to the intermediate node and the intermediate node includes an outbound edge to each of the feature nodes. The number of edges is, therefore, reduced from 35 to 12.

When determining access privileges corresponding to a user (or group of users), graphing service 101 traces privilege graph 131 from the user through the intermediate node (305). As graphing service 101 traces privilege graph 131 for more users, the amount of processing time saved by not having to trace the original number of edges may be significant. Operation 300 may be performed on privilege graph 131 multiple times to identify additional sets of nodes with edges to the same outbound nodes and create intermediate nodes therebetween. Should graphing service 101 perform both operations 200 and 300 to combine nodes and reduce edges, then graphing service 101 will have fewer nodes and fewer edges to process when accessing privilege graph 131.

Figure 4:
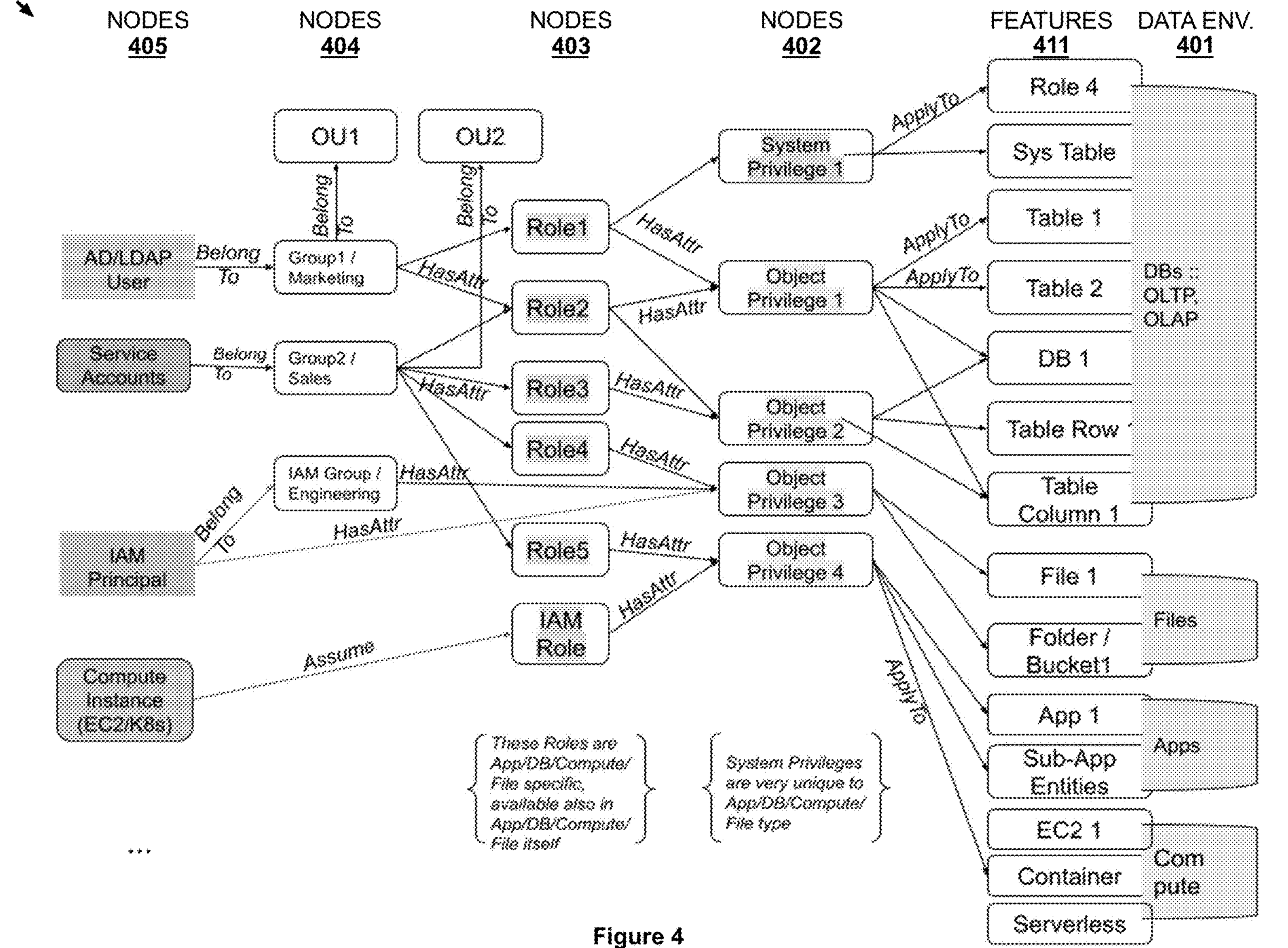
FIG. 4 illustrates a privilege graph representing data access authorizations.

FIG. 4 illustrates privilege graph 400 representing data access authorizations. Privilege graph 400 is an example of privilege graph 131. Data environments 401 are examples of data environments 102. Data environments 401, in this example, include databases, such as databases for Online Transaction Processing (OLTP) and Online Analytical Processing (OLAP), files, applications, and computing resources. Nodes 402 are at a level in the privilege graph that points to particular feature nodes 411 representing features of data environments 401 that are accessible to users having attributes that led to respective ones of nodes 402 during traversal of privilege graph 400. Nodes 403 are nodes at a level prior to reaching nodes 402 and represent different roles that a user may have. Similarly, nodes 404 are at a level prior to reaching nodes 403 and represent different groups in which a user may be included. The level before nodes 404 is a level with nodes 405, which represent the users themselves. When a user in nodes 405 has a particular attribute (e.g., is in a particular group), an edge from the node 405 for that user is displayed to a node of nodes 404 representing that attribute. From that node 404, edges are displayed to nodes of nodes 403 that represent other attributes (e.g., roles) that users in the node 404 have. From one of the nodes 403 to which one of those edges terminated, edges are displayed to nodes of nodes 402 that represent other attributes (e.g., privileges) that the users in the node 403 have. As can be seen on privilege graph 400, the edges from nodes 405 may direct to any one of nodes 402-404 because different types of users may not have certain attributes (e.g., may not belong to groups or have a role). Likewise, a user node, like the IAM principal node of nodes 405, may include edges to different levels of nodes.

Privilege graph 400 is an example of a privilege graph after performing operations 200 and 300, as described above. As such, there are no nodes that can be combined into a combined node and there is no place in privilege graph 400 where an intermediate node can be placed.

In the above examples, changes to attributes, identities, resources, etc. are incorporated into the graph by repeating the above operations. For instance, a new attribute node may be created that includes the same outbound edges as a combined node already created in accordance with operation 200 above. Operation 200, when performed again, would recognize the new attribute node and combine it with the already created combined node. Similarly, if an attribute already incorporated into a combined node is no longer associated with one or more of the combined node's outbound edges, then that attribute may be removed from the definition of the combined node. A new node for the attribute may then be created with any remaining outbound edges. Operation 200 may then combine that new node with other nodes.

Figure 5A:
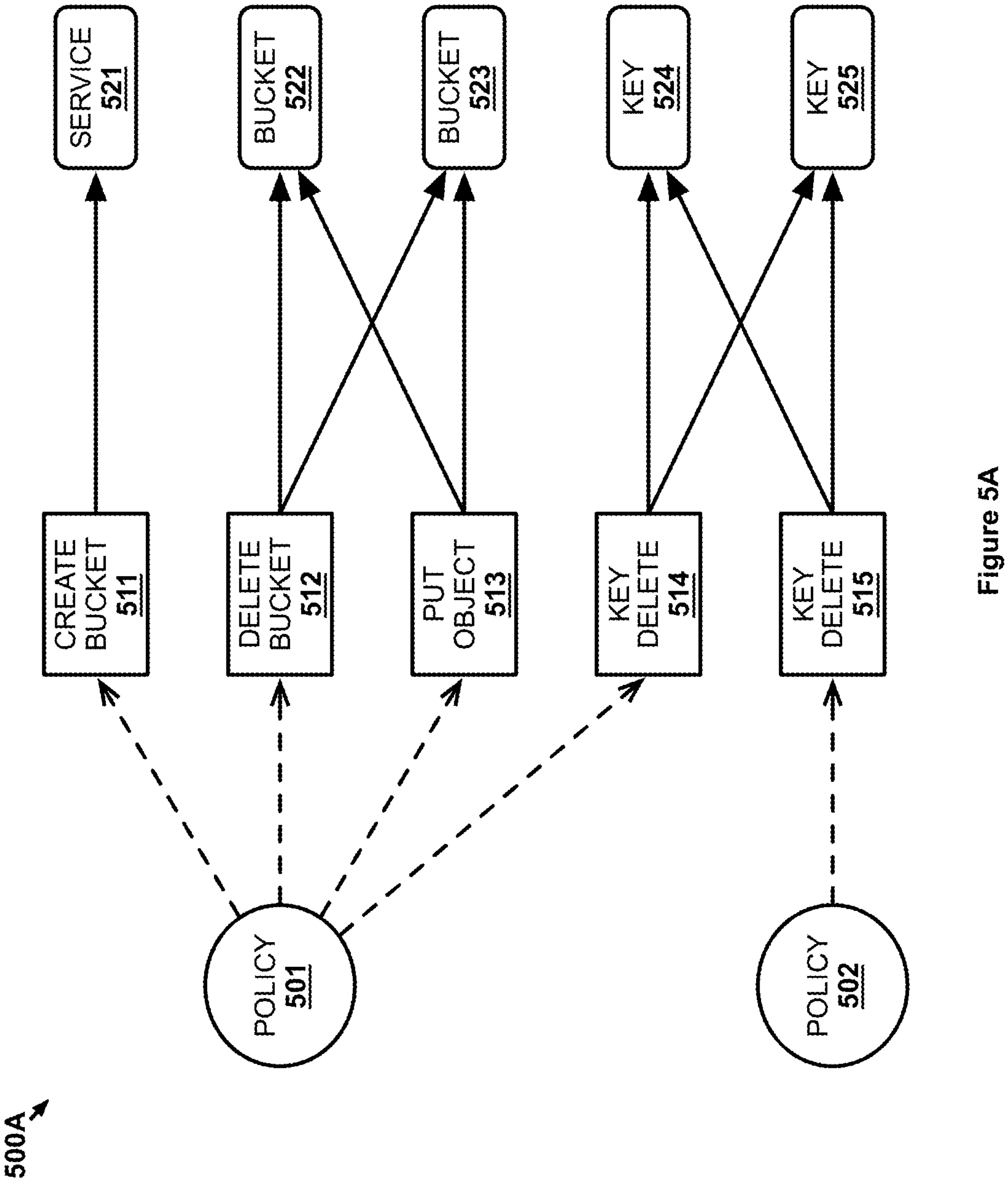
FIGS. 5A-B illustrate an operational scenario for deduplicating nodes in a privilege graph.
Figure 5B:
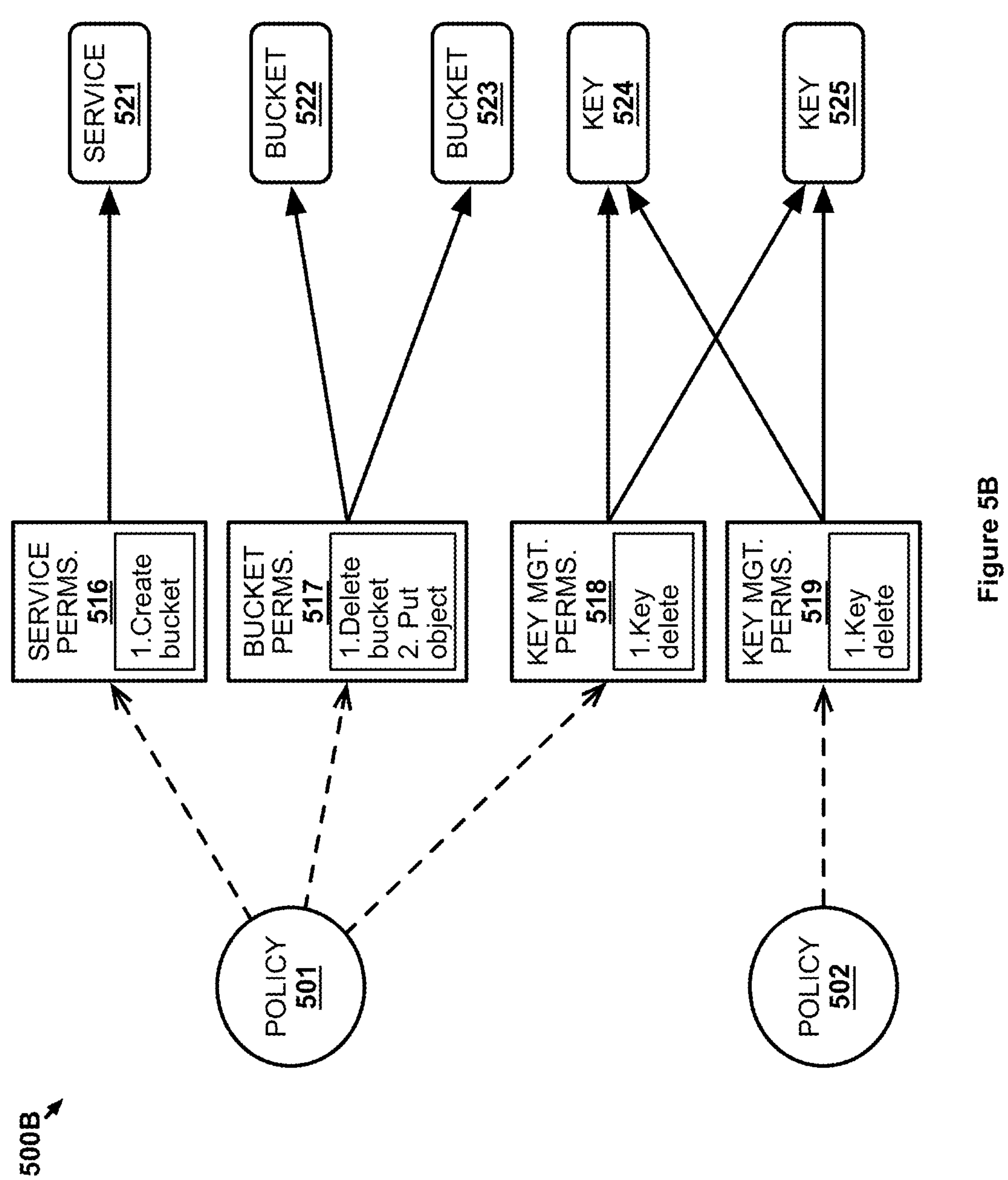

FIGS. 5A-B illustrate operational scenario 500 for deduplicating nodes in a privilege graph. Operational scenario 500 is an example of how nodes of privilege graph 131 may be deduplicated to reduce the number of potential paths that graphing service 101 may need to traverse when responding to queries of privilege graph 131. Path reductions enable processing resources of graphing service 101 to be used for other purposes, such as responding to other permissions queries. If privilege graph 131 is being used to determine whether a user has access to a particular resource (i.e., feature of data environments 102), the user may be granted or denied access to that resource more quickly when graphing service 101 has fewer paths to process.

FIG. 5A illustrates scenario portion 500A of operational scenario 500. Scenario portion 500A includes nodes 511-515 and 521-525 as example nodes of privilege graph 131. Nodes 511-515 are permission nodes with attributes defining permissions of users having attributes coming before nodes 511-515 in privilege graph 131. Nodes 521-515 are resources to which the permissions apply, as indicated by the edges connected nodes 521-515 to nodes 521-525. Nodes 521-514 were created from policy statement 501, which defined the permissions of nodes 521-514. Similarly, Node 515 was created from policy statement 502, which defined the permission of node 515 being key delete permission 515.

Create bucket permission 511 applies to bucket storage service 521, which enables a permitted user to create buckets within bucket storage service 521. Delete bucket permission 512 applies to storage bucket 522 and storage bucket 523, which enables a user to delete the buckets from bucket storage service 521. Put object permission 513 also applies to storage bucket 522 and storage bucket 523 and enables a user to put objects in storage bucket 522 and storage bucket 523. Key delete permission 514 and key delete permission 515 apply to encryption key 524 and encryption key 525 and enable a user to delete encryption key 524 and encryption key 525.

FIG. 5B illustrates scenario portion 500B of operational scenario 500. In scenario portion 500B nodes 511-515 have been reduced to nodes 516-519 using steps described in operation 200. In this example, only nodes from the same policy are combined into a single node. If any modifications are made to a policy, only nodes stemming from that policy are affected. As such, even though key delete permission 514 and key delete permission 515 from scenario portion 500A both have outbound edges to encryption key 524 and encryption key 525, key delete permission 514 and key delete permission 515 are not combined into a single node. Instead, delete bucket permission 512 and put object permission 513, which share outbound edges to storage bucket 522 and storage bucket 523, are combined into bucket permissions 517 because they stem from the same policy statement 501. Likewise, only nodes with permissions corresponding to the same resource types are combined. In this case, delete bucket permission 512 and put object permission 513 both apply to storage buckets, which are the same resource type. Create bucket permission 511 on the other hand applies to bucket storage service 521, which is a service and not a storage bucket. Thus, create bucket permission 511 corresponds to a different resource type from delete bucket permission 512 and put object permission 513.

In some example, the new node may be a modification of one of the existing nodes. For instance, delete bucket permission 512 may be modified by graphing service 101 to bucket permissions 517 and indicate put object permission 513 along with delete bucket permission 512. Put object permission 513 may then be deleted by graphing service 101 after moving inbound edges directed to put object permission 513 to instead be directed to bucket permissions 517. Alternatively, bucket permissions 517 may be a newly generated node by graphing service 101 with the inbound and outbound edges moved (while preferably being deduplicated) from delete bucket permission 512 and put object permission 513 to the new node. Delete bucket permission 512 and put object permission 513 can then be deleted.

While only two nodes are combined into one for scenario portion 500B, other examples may include many more nodes being combined into one. Also, service permissions 516, key management permissions 518, and key management permissions 519 are similarly created in this example even though only one permission is incorporated therein (e.g., service permissions 516 only include create bucket permission 511). This enables future permissions created by modifying policy statement 501 or policy statement 502 to easily be incorporated into an already generated node. In other examples, the original nodes may be maintained when no other nodes are combined.

While the above examples discuss the combination of nodes already existing in privilege graph 131, in other examples, the process may be performed prior to a policy being represented in privilege graph 131. For example, policy statement 501 may be a new policy or is otherwise not represented in privilege graph 131. Rather than creating nodes 511-514 to indicate policy statement 501 and then combining delete bucket permission 512 and put object permission 513, graphing service 101 may generate nodes 516-518 from the onset and add nodes 516-518 into privilege graph 131.

Figure 6A:
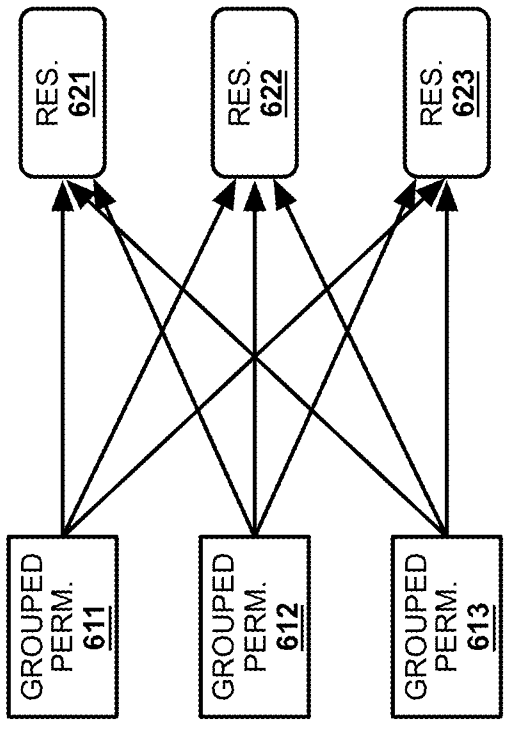
FIGS. 6A-C illustrate an operational scenario for deduplicating edges in a privilege graph.
Figure 6A:
Figure 6B:
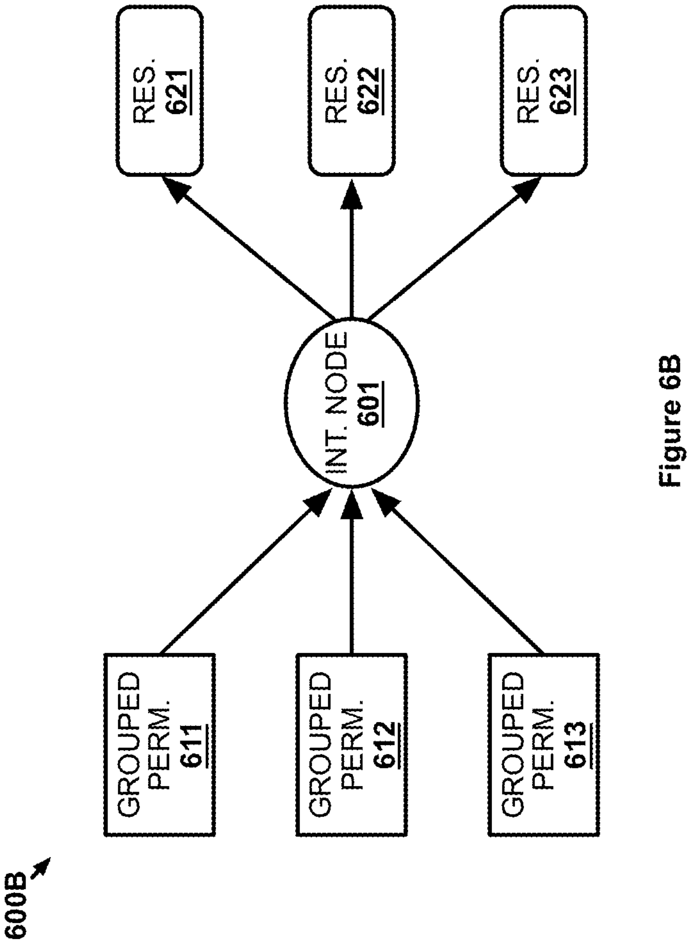
Figure 6C:
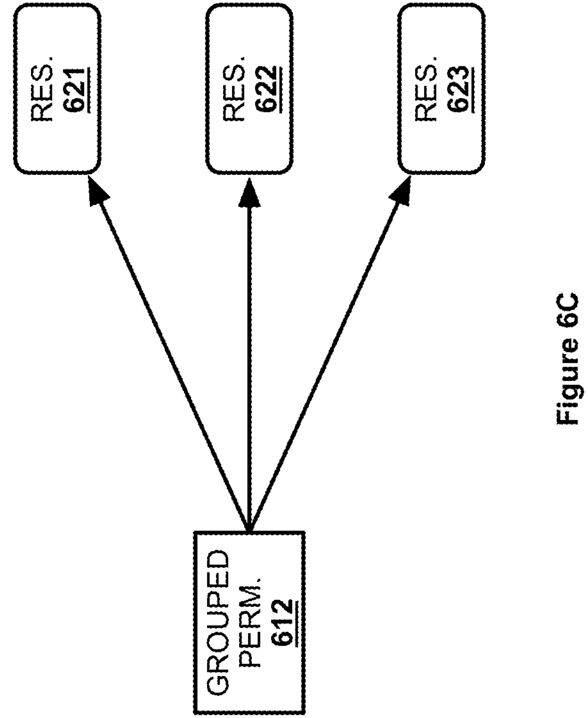

FIGS. 6A-C illustrate an operational scenario 600 for deduplicating edges in a privilege graph. Operational scenario 600 is an example of how edges of privilege graph 131 may be deduplicated to reduce the number of potential paths that graphing service 101 may need to traverse when responding to queries of privilege graph 131. The path reductions will have similar benefits to those described above with respect to node deduplication.

FIG. 6A illustrates scenario portion 600A of operational scenario 600. In this example, nodes 611-613 and 621-623 are example nodes of privilege graph 131. Specifically, each of grouped permissions 611-613 include outbound edges directed towards resources 621-623. Resources 621-623 are each a feature of data environments 102 to which users in grouped permissions 611-613 have access. In other examples, the number of permissions nodes and the number of resource nodes may not be equal. Likewise, in other examples, the permissions may not apply to groups of users. Although, it is more common for groups of users to be allowed to access the same resources as other groups.

FIG. 6B illustrates scenario portion 600B of operational scenario 600. In scenario portion 600B, the edges between nodes 611-613 and nodes 621-623 have been reduced using the steps of operation 300. Graphing service 101 creates intermediate node 601 after recognizing nodes 611-613 have the same outbound edges (i.e., all have edges to nodes 621-623 and no other outbound edges). Graphing service 101 replaces the outbound edges to nodes 621-623 from nodes 611-613 with edges to intermediate node 601. Graphing service 101 also creates outbound edges to nodes 621-623 from intermediate node 601. The nine total edges shown in scenario portion 600A are reduced to six total edges in scenario portion 600B. The reduction in edges will be more drastic with even more nodes involved than the six nodes of operational scenario 600.

FIG. 6C illustrates scenario portion 600C of operational scenario 600. Intermediate node 601 from scenario portion 600B is only used internally by graphing service 101 when processing privilege graph 131 (e.g., traversing privilege graph 131 to respond to queries about the information in privilege graph 131). While the reduction in paths enabled by intermediate node 601 helps reduce the number of paths graphing service 101 may need to traverse, intermediate node 601 is of no importance to the privilege information represented in privilege graph 131. Therefore, when supplying information to external consumers, graphing service 101 omits the existence of intermediate node 601 from the information. An external consumer may be an application, system, human user, or some other entity interested in the information included in privilege graph 131.

In a specific example shown in scenario portion 600C, graphing service 101 may receive a query from user terminal 103. The query requests which resources of data environments 102 a user in a group has access. Graphing service 101's traversal of privilege graph 131 in this example finds that grouped permissions 612 applies to the group and provides the portion of privilege graph 131 shown in scenario portion 600C in response to the query. After receiving the portion, user terminal 103 may display the portion to user 141 or may use the information represented by the portion for some other purpose (e.g., to audit whether the user should have access to all of resources 621-623). As can be seen in scenario portion 600C, intermediate node 601 is removed from the paths between grouped permissions 612 and resources 621-623. The information is, therefore, presented as though it was retrieved from scenario portion 600A prior to intermediate node 601 being created. Advantageously, existence of intermediate node 601 affects the number of paths that graphing service 101 may need to process but does not affect the information provided by graphing service 101.

Figure 7:
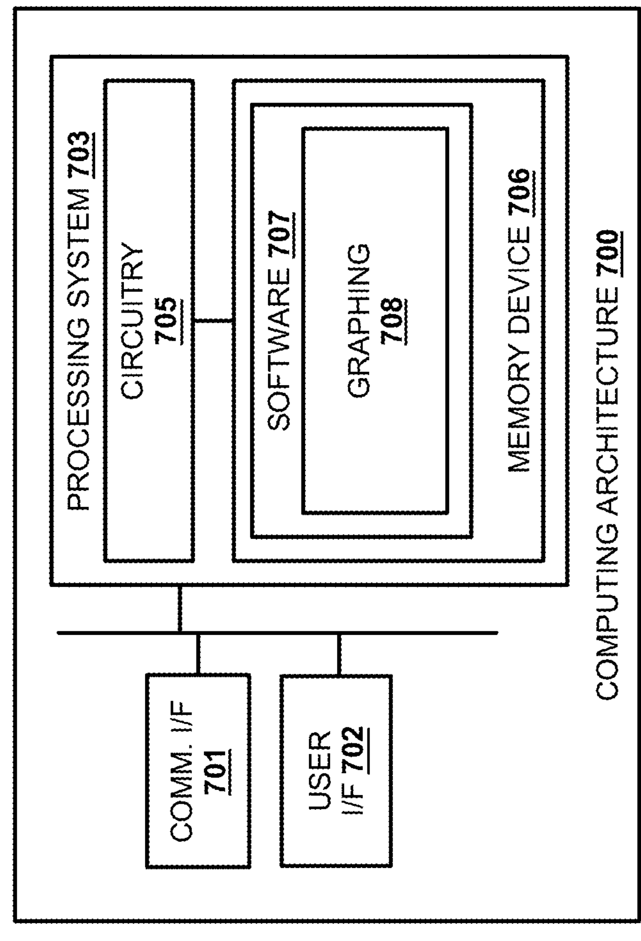
FIG. 7 illustrates a computing architecture for deduplicating edges and nodes in privilege graph.

FIG. 7 illustrates computing architecture 700 for deduplicating edges and nodes in privilege graph. Computing architecture 700 is an example computing architecture for implementing graphing service 101. A similar architecture may also be used for other systems described herein, such as user terminal 103, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises one or more computer readable storage media, such as a disk drive, flash drive, data storage circuitry, or some other memory apparatus—including combinations thereof. In no examples would a computer readable storage medium of memory device 706, or any other computer readable storage medium herein, be considered a transitory form of signal transmission (often referred to as “signals per se”), such as a propagating electrical or electromagnetic signal or carrier wave. Operating software 707 comprises computer programs, firmware, or some other form of machine-readable processing instructions. Operating software 707 includes access graphing module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, graphing module 708 directs processing system 703 to identify two attribute nodes of a plurality of nodes in a privilege graph. The privilege graph indicates access privileges for a plurality of users to features of a plurality of data environments. Graphing module 708 further directs processing system 703 to determine that the two attribute nodes share the same one or more outbound edges and combine the two nodes into a combined node. The combined node represents attributes represented by the two attribute nodes. Graphing module 708 also directs processing system 703 to trace the privilege graph from a user through the combined node when determining which of the access privileges correspond to the user.

In addition, or as an alternative, to the above steps, graphing module 708 directs processing system 703 to identify a first plurality of nodes in a privilege graph that share the same plurality of outbound edges to a plurality of outbound nodes. The privilege graph indicates access privileges for a plurality of users to features of a plurality of data environments. Graphing module 708 further directs processing system 703 to create an intermediate node and remove the plurality of outbound edges. Graphing module 708 directs processing system 703 to create first replacement edges from each of the first plurality of nodes to the intermediate node and create second replacement edges from the intermediate node to each of the plurality of outbound nodes. Graphing module 708 also directs processing system 703 to trace the privilege graph from a user through the intermediate node when determining which of the access privileges correspond to the user.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for regulating access to computing resources using a graphing service, the method comprising:

in a computing system implementing the graphing service:

determining that two attribute nodes of a plurality of nodes in a privilege graph share the same one or more outbound edges within the privilege graph, wherein the privilege graph indicates access privileges for a plurality of users to features of a plurality of data environments;

generating a combined node;

assigning attributes represented by the two attribute nodes to the combined node; and tracing the privilege graph from a user through the combined node when determining which of the access privileges correspond to the user.

2. The method of claim 1, wherein determining that the two attribute nodes share the same one or more outbound edges comprises:

determining that the attributes comprise permissions to the same resource type corresponding to the outbound edges.

3. The method of claim 2, comprising:

identifying a policy statement that indicates the permissions.

4. The method of claim 1, comprising:

moving inbound edges of the two attribute nodes to the combined node; and moving the outbound edges to the combined node.

5. The method of claim 4, wherein combining the two attribute nodes comprises:

deleting the two attribute nodes from the privilege graph.

6. The method of claim 1, wherein generating the combined node comprises:

designating one of the two attribute nodes as the combined node.

7. The method of claim 6, comprising:

moving inbound edges of another of the two attribute nodes to the combined node.

8. One or more non-transitory computer readable storage media having program instructions stored thereon for regulating access to computing resources, the program instructions, when executed by a processing system, direct the processing system to:

combine a first plurality of nodes in a privilege graph that share the same first outbound edges, wherein the privilege graph indicates access privileges for a plurality of users to features of a plurality of data environments;

insert an intermediate node between a second plurality of nodes and a plurality of outbound nodes shared by the second plurality of nodes;

identify two attribute nodes of the first plurality of nodes;

determine that the two attribute nodes share the same one or more outbound edges;

generate a combined node;

assign attributes represented by the two attribute nodes to the combined node; and trace the privilege graph when determining which of the access privileges correspond to the user.

9. The one or more non-transitory computer readable storage media of claim 8, wherein the privilege graph is traced through the combined node.

10. The one or more non-transitory computer readable storage media of claim 8, wherein the one or more outbound edges point to resources of the same resource type.

11. The one or more non-transitory computer readable storage media of claim 8, wherein the first plurality of nodes represent permissions defined by a policy statement.

* * * * *